(12) United States Patent
Yoshida (10) Patent No.: US 8,801,288 B2
(45) Date of Patent: Aug. 12, 2014

(54) MINIATURE LINEAR MOTION GUIDE UNIT WITH LUBRICATION SYSTEM

(75) Inventor: Yoshihiro Yoshida, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 83 days.

(21) Appl. No.: 13/361,487

(22) Filed: Jan. 30, 2012

(65) Prior Publication Data

US 2012/0201483 A1    Aug. 9, 2012

(30) Foreign Application Priority Data

Feb. 9, 2011    (JP) ................................. 2011-025631

(51) Int. Cl.
*F16C 33/10* (2006.01)
*F16C 29/06* (2006.01)

(52) U.S. Cl.
USPC .............................................. 384/13; 384/43

(58) Field of Classification Search
USPC ....................... 384/13, 43–45, 52; 184/18–20
See application file for complete search history.

(56) References Cited

U.S. PATENT DOCUMENTS

| | | | |
|---|---|---|---|
| 6,024,490 A * | 2/2000 | Shirai ............................... 384/13 |
| 6,190,046 B1 * | 2/2001 | Agari ............................... 384/13 |
| 6,619,148 B2 * | 9/2003 | Nishide ......................... 74/89.44 |
| 7,387,441 B2 * | 6/2008 | Ubukata et al. .................. 384/13 |
| 7,479,885 B2 * | 1/2009 | Greubel ....................... 340/572.7 |
| 7,637,662 B2 | 12/2009 | Kato et al. |
| 7,862,234 B2 | 1/2011 | Kuwabara et al. |
| 2002/0181810 A1 * | 12/2002 | Menges et al. ................... 384/45 |
| 2005/0018934 A1 * | 1/2005 | Lee et al. .......................... 384/45 |
| 2005/0232520 A1 * | 10/2005 | Yamazaki et al. ............... 384/45 |
| 2007/0053619 A1 * | 3/2007 | Kuwabara ........................ 384/13 |
| 2008/0080795 A1 * | 4/2008 | Kuwabara et al. ............... 384/13 |

FOREIGN PATENT DOCUMENTS

| | | |
|---|---|---|
| JP | 2006-38195 A | 2/2006 |
| JP | 2008-82433 A | 4/2008 |

* cited by examiner

*Primary Examiner* — Richard W Ridley
*Assistant Examiner* — Yamilka Pinero Medina
(74) *Attorney, Agent, or Firm* — Browdy and Neimark, PLLC (57) ABSTRACT

A linear motion guide unit is provided which is downsized in size, maintenance-free for lubrication, and makes it possible to assemble easily and quickly the slider with accuracy. The end cap has outward end surfaces each of which is concaved to provide a first recess to fit over a lubricant applicator of porous compact to apply the rollers while running through the turnaround passages, and a second recess to fit over a retainer plate. The retainer plate is surrounded with a peripheral edge of the end cap and held in place with a snap-fit engagement with the end cap to squeeze the lubricant applicator inside the first recess in the end cap.

7 Claims, 10 Drawing Sheets

MINIATURE LINEAR MOTION GUIDE UNIT WITH LUBRICATION SYSTEM

FIELD OF THE INVENTION

The present invention relates to a miniature ball-spline in which a cylindrical slider fits over a guide shaft round in cross section having a diameter of not more than 6 mm. More particularly, it relates a miniature linear motion guide unit with lubrication system in which the slider fits over the guide shaft to move lengthwise relative to the guide shaft while transmitting mutual torque between them.

BACKGROUND OF THE INVENTION

Modern linear motion guide units are finding increased applications in diverse fields including various assembling machines, semiconductor manufacturing equipment, and so on. Corresponding to the downsizing requirement in the applied fields, the advanced sliding devices are more needed to meet miniaturization or downsizing in construction and maintenance-free working for lubrication. Especially, the micromechanical ball-splines frequently used as linear motion guide units in semiconductor manufacturing equipment, and so on, are challenged to meet the maintenance-free working for lubrication.

In a commonly-assigned U.S. Pat. No. 7,637,662B2, US counterpart of Japanese Laid-Open Patent Application No. 2006-38195A, there is described a rolling guide unit which allows greater freedom of design considerations, easier control of lubricant, and less resistance against sliding movement of the rolling elements. The prior rolling guide unit has a lubricant-impregnated member installed inside a cavity made in a cylindrical carriage of a slider, and a lubricant applicator built in an end cap of the slider to apply the lubricant around rolling elements while rolling through a turnaround passage in the end cap, the lubricant applicator being urged forcibly against the lubricant-impregnated member. With the prior rolling guide unit constructed as stated earlier, accordingly, the carriage is needed to have any extra space to provide the cavity for installation of the lubricant-impregnated member adjacent to the circulating circuit for the rolling elements. Further, the lubricant applicator has to have the desired size and stiffness enough to bear the squeeze against the lubricant-impregnated member. This means the prior rolling guide unit constructed as stated earlier is unsuited for the miniaturization or downsizing of the unit.

Another example of prior linear motion guide units is disclosed in a commonly-assigned U.S. Pat. No. 7,862,234B2, US counterpart of Japanese Laid-Open Patent Application No. 2008-82433A, in which the application points of lubricant around rolling elements are made in a turnaround passage to ensure proper and steady lubrication by the lubrication system that is simple in construction, with an accompanying sustainable maintenance-free condition for lubrication. A porous compact applicator impregnated with lubricant fits into a recess made to sink below an outward end surface of an end cap, which has a hole defined therein to communicate the recess with a turnaround passage. The porous compact applicator has a nose extending through the hole in the end cap to lead lubricant into the turnaround passage. The porous compact fits snugly into the recess in a fashion that the nose comes into rolling-touch at its tip with the rollers as they roll through the turnaround passage, applying the rollers with lubricant delivered from the nose. With the linear motion guide unit constructed as stated in this way, since the outward end surface of the end cap has a comparatively large area, the porous compact applicator to be laid on the substantially overall area of the outward end surface of the end cap has only stiffness enough allowing the porous compact applicator to fit easily into the recess in the end cap just by manual handling. Only installation of an end seal over the outward end surface of the end cap is necessary to make certain of steady application of lubricant around the rolling elements while rolling through the turnaround passage.

Though the prior linear motion guide unit constructed as stated in this way was befitting for maintenance-free operation for lubrication, yet it remained a major challenge to develop any miniature or micromechanical ball-spline. In conventional production of the miniature ball-spline in which tiny or minute parts were selected, discerned from each other and then assembled together, the assemblage of the tiny parts was found to be a formidable task. With the design considerations of adding the lubricating function to the end cap in the prior ball-spline constructed as stated in this way, more especially, the parts and/or components for the end cap needed to be even smaller or tinier than in the prior miniature ball-spline. This meant there remained a major challenge about how to locate microscopic pieces or parts in place, then assemble them together, and join them together while keeping them in assembled relation into the finished end cap.

Following the ball-spline explained in the commonly-assigned U.S. Pat. No. 7,637,662 B2 as recited earlier, a ball-spline has been developed, which is improved to have lubricating function and more downsized to be applicable to a guide shaft having a diameter of from 2 to 6 mm. The subject matter disclosed herein is how to build a lubricant applicator in a miniature end cap with ease in assembling work and accuracy in location. The linear motion guide unit of the present invention, although following the miniature ball-spline with a built-in lubricating system developed earlier, is motivated to find a way out of deadlock or difficulty encountered in the conventional production process in which more downsized pieces or parts than ever are selected individually, discerned and then assembled together into the end cap. With the miniature ball-spline with built-in lubricating system of the present invention, in summary, a lubricant applicator of porous compact is built in an end cap and confined inside the end cap with a retainer plate which is kept in the end cap by means of a snap-fit engagement with the end cap to squeeze the lubricant applicator.

SUMMARY OF THE INVENTION

The present invention has for its primary object to overcome the major challenge as stated earlier, and to provide a ball-spline in which a porous compact lubricant applicator fits in an outward end surface of an end cap, the porous compact lubricant applicator having a volumetric size enough to preserve therein a desired amount of lubricant, and a retainer plate or disc is built in the end cap and held in place with a snap-fit engagement with the end cap to keep the lubricant applicator in place while squeezing the lubricant applicator, whereby the miniature parts including the lubricant applicator and retainer plate are assembled into the unitary end cap. The end cap assembled in this way is combined with a carriage into a finished slider. Thus, the present invention provides a miniature linear motion guide unit with a ball-spline and a lubrication system that helps realize maintenance-free operation for lubrication over a prolonged service life.

The present invention is concerned with miniature linear motion guide unit with a lubrication system comprising: an elongated guide shaft having first raceway grooves extending lengthwise of the guide shaft at locations circumferentially spaced apart from each other and a slider fitting over or conforming to the guide shaft to move along the guide shaft in a sliding manner through rolling elements, wherein the slider is composed of a carriage having second raceway grooves lying in opposition to the first raceway grooves on the guide shaft to define load-carrying races between the first raceway grooves on the guide shaft and the second raceway grooves on the carriage and further having return passages extending in parallel with the load-carrying races, end caps attached to lengthwise opposite ends of the carriage, the end caps having turnaround passages to connect the load-carrying races with the return passages, and the rolling elements recirculating through looped circuits made up of the load-carrying races, return passages and the turnaround passages, wherein the end caps each are provided therein with a porous compact lubricant applicator impregnated with lubricant to apply the lubricant to the rolling elements while rolling through the turnaround passages and a retainer plate to squeeze the lubricant applicator to seal and secure the lubricant applicator at a preselected location, and wherein the retainer plate is secured in place by a snap-fit engagement with the end cap.

In the present invention, a miniature linear motion guide unit with lubrication system is disclosed in which the end caps each have a concave outward end surface defining a first recess to receive the lubricant applicator, a second recess to fit snugly over the retainer plate and a circular edge surrounding the lubricant applicator and the retainer plate which is received inside the respective recesses.

In the present invention, a miniature linear motion guide unit with a lubrication system is disclosed in which the end cap is made of elastic synthetic resins and has a locking recess on the circular edge of the end cap. The retainer plate is made of elastic synthetic resins and has a locking nose on the circumferential edge around the retainer plate. The locking nose experiences elastic deformation to snap into the locking recess to make the snap-fit engagement between the retainer plate and the end cap.

In the present invention, a miniature linear motion guide unit with a lubrication system is disclosed in which the guide shaft is a round rod circular in a transverse section view and is not more than 6 mm in diameter and the slider is a cylindrical shell which fits over or conform to the guide shaft. The guide shaft and the slider are combined to form a ball spline to transmit torque between the guide shaft and the slider through the rolling elements.

In the present invention, a miniature linear motion guide unit with a lubrication system is disclosed in which the retainer plate on a backside thereof facing on the lubricant applicator has presser pawls to squeeze the lubricant applicator.

In the present invention, a miniature linear motion guide unit with a lubrication system is disclosed in which the retainer plate is depressed below a front surface thereof opposite to the backside facing on the carriage to provide a counter sink to fit over a head of a fastening bolt to tighten the retainer plate against the carriage and correspondingly raised above the backside to provide a lug. The circular edge on the end cap is partially cut out at a location conforming to the lug of the retainer plate to provide a recess to guide and fit over the lug of the retainer plate. The retainer plate is set in place with respect to the end cap while the lug of the retainer plate fits into the recess on the end cap. The retainer plate is locked or held in the end cap with the snap-fit engagement after the lug of the retainer plate has snugly fit into the recess on the end cap. The fastening bolt extends past the end cap from the counter sink to fit into the carriage, such that when tightened, the recess in the end cap and the lug of the retainer plate are squeezed together or closely pressed against each other to keep in place the lubricant applicator and the retainer plate with respect to the end cap.

In the present invention, a miniature linear motion guide unit with a lubrication system in which the end cap is composed of a spacer and an end cap major body, the spacer having a backside coming into abutment against any one of lengthwise opposite end surfaces of the carriage and a front surface opposite to the backside across the spacer. The front surface has curved inner halves of the turnaround passages, and the end cap major body has a backside to come into abutment against the front surface of the spacer. The backside is provided with curved outer halves of the turnaround passages in opposition to the curved inner halves of the turnaround passages on the spacer. The end cap major body has an aperture to accommodate therein a lubricant reservoir of the lubricant applicator and an opening or through-hole to fit over an applicator nose of the lubricant applicator.

In the present invention, a miniature linear motion guide unit with a lubrication system is disclosed in which the lubricant applicator is composed of a porous or open-cell compact applicator formed by a sintered resinous member of finely powdery ultrahigh molecular weight synthetic resin whose particles are partially fused together under pressure together with application of heat to provide an open-cellular texture in which cells are open to each other through interstices among fused particles and filled with lubricant. Further, the lubricant applicator is composed of the lubricant reservoir have a block shape that fits snugly into the aperture provided in the end cap major body at a location near a load race-sided end of the turnaround passage. The applicator nose has a rectangular shape in a transverse section view and extends into the opening drilled through a curved surface of the turnaround passage at a location near a return passage-sided end of the turnaround passage to expose a leading edge thereof to the turnaround passage to apply the lubricant around the rolling elements. The leading edge of the applicator nose further has a curved edgewise surface which closely matches the curved surface of the turnaround passage, and a connector of curved plate joining integrally the lubricant reservoir and the applicator nose.

In the present invention a miniature linear motion guide unit with a lubrication system disclosed in which the end cap major body has a locating projection of flat and rectangular shape in a transverse section view lying along an inside circular surface in the end cap major body, the locating projection being raised above the backside of the end cap major body to fit past a recess in the spacer into a recess lying along an inside circular surface in the carriage, thereby locating and setting the end cap major body with accuracy to the carriage.

In the present invention, a miniature linear motion guide unit with a lubrication system is disclosed in which the carriage, when viewed on the end surface thereof, has the raceway grooves at two locations spaced diametrically opposite to each other, and the return passages lying in bilateral symmetry with respect to a line lying midway between the raceway grooves, thereby making it possible to use the same end caps on either of the opposite ends surface of the carriage to complete the slider.

With the linear motion guide unit of the present invention, even if the slider is more miniature or downsized so as to fit over the guide shaft not more than 6 mm, for example 4 mm in diameter, the lubricant applicator impregnated with adequate amount of lubricant can be installed in the end cap and sealed with the retainer plate. With the linear motion guide unit constructed as stated earlier, moreover, the lug lying around the retainer plate is first brought into the recess in the circular edge of the end cap to keep in place the retainer plate circumferentially of the end cap. Then, the retainer plate is forced deep in the recess in the end cap to get the locking nose of the retainer plate snapping into the locking recess, thereby keeping axially in place the retainer plate relative to the end cap to secure the retainer plate to the end cap. Thus, the lubricant applicator may be set and sealed easily and certainly inside the end cap to provide the ball spline virtually maintenance-free for lubrication.

As the end cap and the retainer plate are both made of synthetic resins, the locking nose, despite being very small or tiny in size, is deformable elastically so as to easily snap into the locking nose to make snap-fit engagement between the retainer plate and the end cap. Further, the presser pawls on the retainer plate squeeze elastically the lubricant applicator to fasten positively the lubricant applicator, thereby facilitating and simplifying the assembly of the lubricant applicator and the retainer plate inside the end cap in such a way as to keep accurate alignment with each other. With the linear motion guide unit of the present invention, the end cap major body has the apertures to accommodate the lubricant reservoir of the lubricant applicator. Thus, whether the lubricant applicator is surely installed in the end cap major body can be visible at a glance by only looking in at the apertures from the backside of the end cap major body and, therefore no installation of the lubricant applicator will be prevented before the completion of assembly.

DETAILED DESCRIPTION OF THE PREFERRED EMBODIMENTS

Preferred embodiments of the miniature ball-spline with a lubrication system according to the present invention will be explained hereinafter in detail with reference to the accompanying drawings. The miniature ball-spline with lubrication system of the present invention is suited for incorporating a sliding component with a rotary component which is used in combination in a diversity of machines including semiconductor fabricating equipment, assembling machines, conveying machines, and so on.

Figure 1:
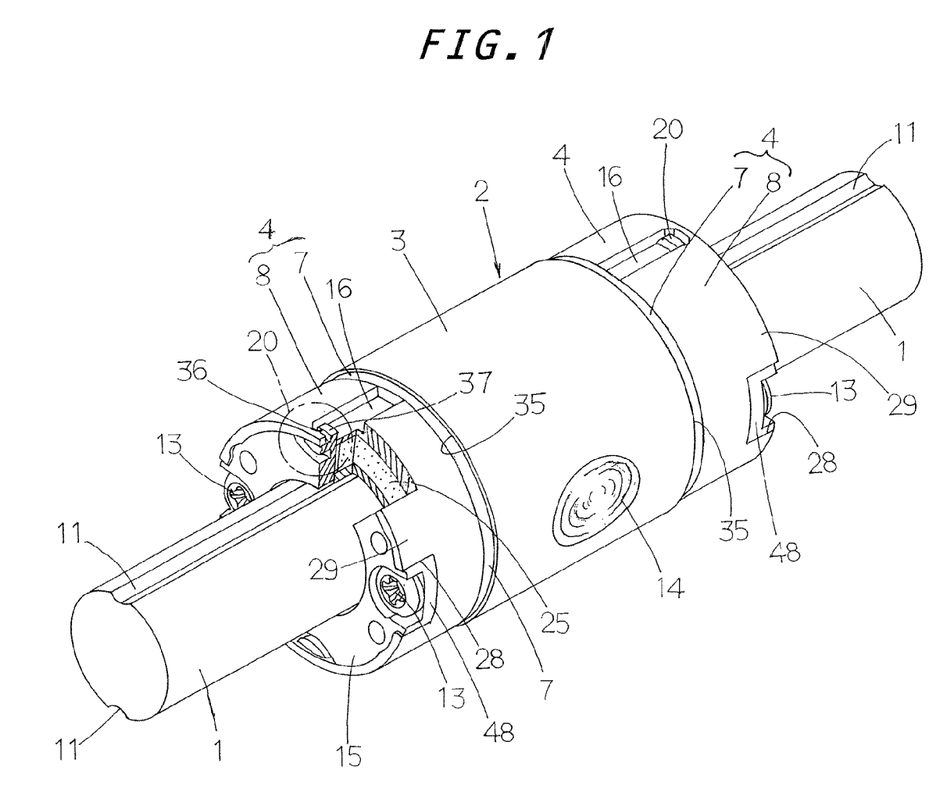
FIG. 1 is a partially cutaway view in perspective showing a preferred embodiment of a miniature linear motion guide unit with a lubrication system constructed according to the present invention.
Figure 2:
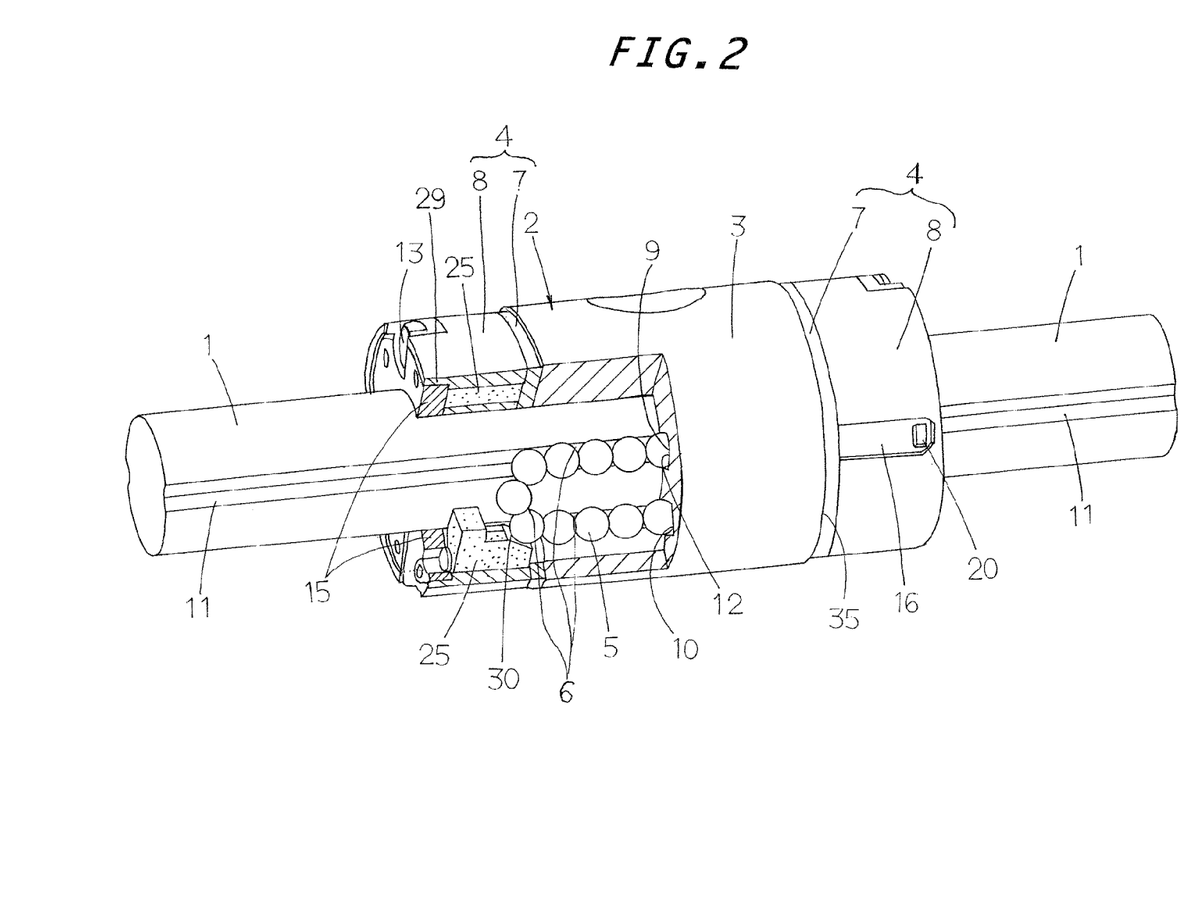
FIG. 2 is a view in perspective, partially cutaway at a location other than in FIG. 1, showing the linear motion guide unit in FIG. 1.
Figure 3:
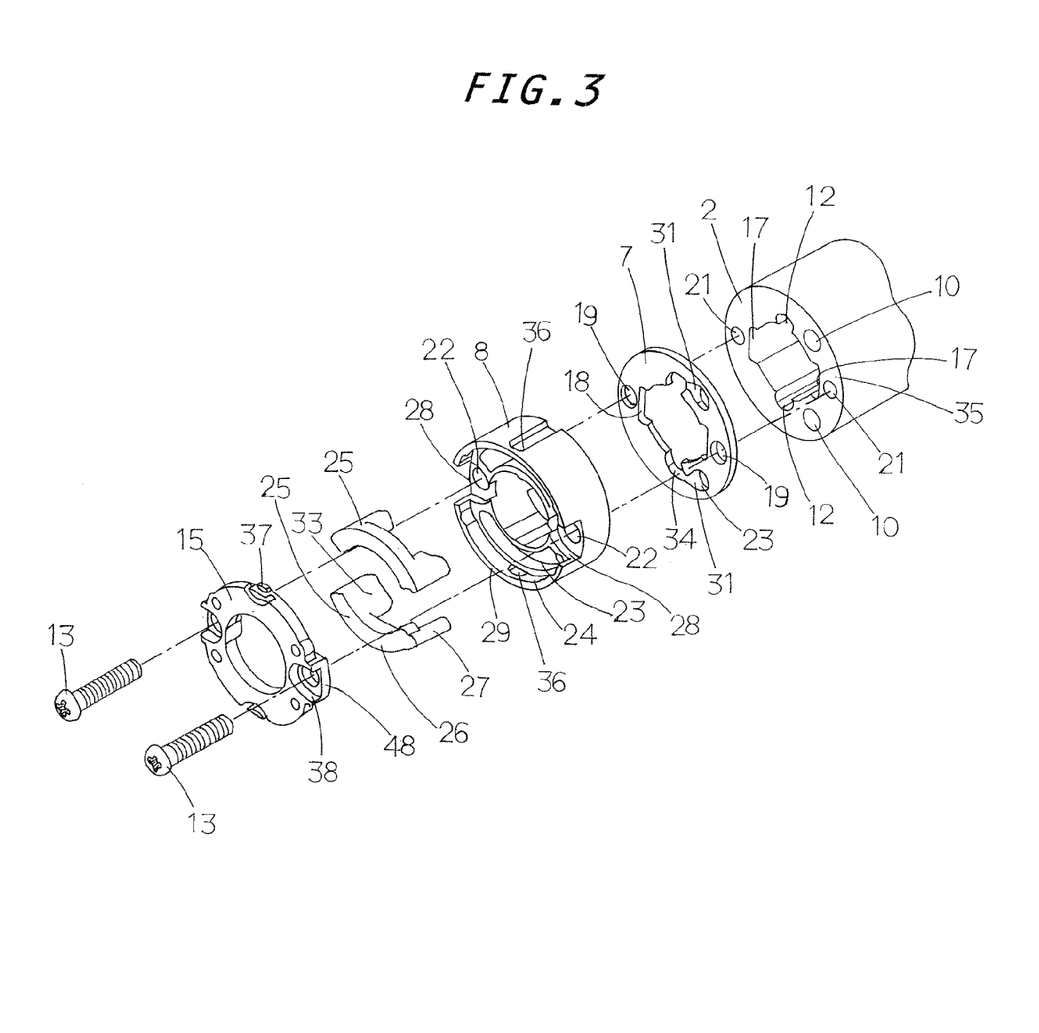
FIG. 3 is an exploded, broken view in perspective to illustrate a slider in the linear motion guide unit in FIG. 1.

Referring first to FIGS. 1 to 3, the miniature linear motion guide unit of the present invention is generally comprised of an elongated guide shaft 1 having raceway grooves 11 lying circumferentially spaced away from each other around the guide shaft 1 and extending lengthwise of the guide shaft 1, and a slider 2 fitting over the guide shaft 1 to move in a sliding manner relatively to the guide shaft 1 through balls 5. The guide shaft 1 is made of a solid rod right circular in a transverse section view and the slider 2 has a cylindrical configuration to fit over the guide shaft 1. The linear motion guide unit constructed as stated above can be called a ball-spline in which the slider 2 is allowed to move or travel relatively to the guide shaft 1, but kept from the turning movement relative to the guide shaft 1, to transmit a torque mutually with the guide shaft 1. The ball-spline of the present invention is downsized or miniaturized in construction to make it possible to use a guide shaft 1 of not more than 6 mm in diameter. With the embodiment explained here, the guide shaft 1 has a diameter of $\phi$ 4 mm and the slider 2 has an outside diameter of $\phi$ 8 mm. The slider 2 is composed of a carriage 3 of a cylindrical shell that has lengthwise raceway grooves 12 extending in opposition to the raceway grooves 11 cut on the spline shaft 1 to provide load-carrying races 9 defined between the raceway grooves 11 on the guide shaft 1 and the raceway grooves 12 on the slider 2 and return passages 10 extending in parallel with the load-carrying races 9, end caps 4 attached to lengthwise opposite end surfaces 35 of the carriage 3, one to each end surface. The end caps 4 are further provided therein with turnaround passages 30 to connect the load-carrying races 9 and the return passages 10, and a plurality of rolling elements or balls 5 recirculating through looped circuits 6, each made up of the load-carrying race 9, return passage 10 and the turnaround passages 30.

The end cap 4 used in the linear motion guide unit of the present invention has a lubrication system as shown in FIGS. 1 to 3. In particular, the end cap 4 accommodates therein a porous or open-cellular compact lubricant applicator 25, which is impregnated with lubricant to apply the lubricant around the balls 5 while they roll through the turnaround passage 30. The porous compact lubricant applicator 25, although but made into a miniature or minute construction, is needed to reserve a preselected amount of lubricant. To this end, a retainer plate or disc 15 is built in the end cap 4 to retain, while squeezing under pressing force, the lubricant applicator 25 in the inside the end cap 4. The retainer plate 15, prior to tightening the end cap 4 to the carriage 3 by means of fastening bolts 13, is tentatively held inside the end cap 4 with using a snap-fit engagement 20 with the end cap 4 to keep the minute parts including the lubricant applicator 25 and retainer plate 15 built in the end cap 4 against falling apart from each other. The end cap 4 sinks below an outward end surface 45 opposite to an end surface facing on the carriage 3, thereby providing a recess (second recess) 24 to fit snugly over the retainer plate 15. The second recess 24 reaches deeply to form a first recess 23 to receive therein the lubricant applicator 25. A circular edge 29 on the outward end surface 45 is left to fit over the retainer plate 15 and the lubricant applicator 25.

The retainer plate 15 is made of a compact of synthetic resins preferable for a minute construction having a smaller thickness, which is in favor of easy placement and just snap-fitting of the retainer plate 15 into the end cap 4 after the minute lubricant applicator 25 has been built in the end cap 4. A locking recess 36 serving as a part for snap-fit engagement is cut in the circular edge 29 of the end cap 4 and a locking nose 37 serving as a counterpart for snap-fit engagement is made on a circumferential edge of the retainer plate 15 in opposition to the locking recess 36. The locking nose 37 on the retainer plate 15 may be subjected to resilient deformation to snap into the locking recess 36 of the end cap 4, making a snap-fit engagement 20 between the retainer plate 15 and the end cap 4. Thus, the retainer plate 15 is fastened to the end cap 4 with the snap-fit engagement 20 in which the locking nose 37 of the retainer plate 15 is snapped into the locking recess 36 in the end cap 4. Moreover, there is provided a locating-and-guide means to make it easier to locate accurately the locking nose 37 of the retainer plate 15 with respect to the locking recess 36 to ensure precise snap-fit of the locking nose 37 into the locking recess 36. The locating-and-guide means is composed of a recess 28 made by partial cut-out of the circular edge 29 on the end cap major body 8, and a lug 48 provided around the retainer plate 15 and designed to be complementary to the recess 28 of the end cap major body 8. The lug 48 lying around the retainer plate 15 is shaped to have a first portion 48A which is raised above a backside 51 of the retainer plate 15 in an axial direction of the end cap 4 to bring the lug 48 into contact with the end cap major body 8 prior to the surface-to-surface engagement of the retainer plate 15 against the end cap major body 8. In this way, the locking nose 37 is accurately located and guided on the retainer plate 15 in the axial direction relative to the locking recess 36. The lug 48 further has a second portion 48B which extends radially outwardly beyond the circumference of the retainer plate 15 to accurately locate and guide the locking nose 37 on the retainer plate 15 in the circular direction relative to the locking recess 36.

The lug 48 on its front surface 52 opposite to the backside 51 has a counter sink 38 to accommodate a head of a fastening bolt 13 to tighten the end cap 4 to the carriage 3. The counter sink 38 communicates with a hole 50 through which the bolt 13 is allowed to extend across an axial distance of the retainer plate 15. The counter sink 38 is designed to have such depth that the head of the bolt 13 lies wholly below the front surface 52 of the retainer plate 15. On the other hand, the end cap 4 has a through-hole 22 which is made inside the recess 28 so as to be in alignment with the hole 50 in the lug 48. After the lug 48 of the retainer plate 15 has fit into the recess 28 in the end cap 4, the bolt 13 extended past through the hole 50 in the lug 48 and the through-hole 22 in the end cap 4 is tightened to hold in place the retainer plate 15 and the lubricant applicator 25 with respect to the end cap 4 while sealing a joint between mating surfaces 53 and 59, one of which is on the lug 48 of the retainer plate 15 and another is in the recess 28 of the end cap 4. It will be noted that the mating surface 59 in the recess 28 of the end cap 4 is designed to lie at a depth level more than a depth of the second recess 24 in the end cap 4 to receive therein the retainer plate 15 while locating and guiding accurately the retainer plate 15 relative to the end cap 4.

The end cap 4 is composed of the end cap major body 8 and a spacer 7. The end cap major body 8 is designed to accommodate therein the lubricant applicator 25 and the retainer plate 15. The spacer 7 has a backside 58 on which the spacer 7 comes into abutment against any one of the lengthwise opposite end surfaces 35 of the carriage 3, and a front surface 57 opposite to the backside 58 across the thickness of the spacer 7. The front surface 57 provides a mating surface 56 which has curved inner halves 31 of the turnaround passages 30. The end cap major body 8 has a backside 47 to come into abutment against the front surface 57 of the spacer 7. The backside 47 is made on the end cap major body 8 with curved outer halves 32 of the turnaround passages 30 in opposition to the curved inner halves 31 of the turnaround passages 30 on the spacer 7. As a result, after the end cap major body 8 has joined with the spacer 7, the curved outer halves 32 come into engagement with the curved inner halves 31 to complete the turnaround passages 30 in the end cap 4. Moreover, the spacer 7 has grooves 34 which are made at terminals of the curved inner halves 31 of the turnaround passages 30 to lead to the load-carrying races 9. With the lubrication system constructed according to the present invention, especially as shown in FIG. 2, the lubricant applicator 25 packed into the end cap 4 comes into touch with the rolling elements of balls 5 while they roll through the turnaround passages 30, whereby the lubricant seeping out of the lubricant applicator 25 is applied around the balls 5. As the balls 5 coated with the lubricant roll through the load-carrying race 9, the raceway grooves 11 and 12 to define the load-carrying race 9 are in turn lubricated. With the end cap 4 constructed as stated earlier, the porous compact lubricant applicator 25 is first packed into the end cap major body 8. Then the retainer plate 15 is fitted into the end cap major body 8 to lock the lubricant applicator 25 in the end cap major body 8, when the retainer plate 15 is held in the end cap major body 8 by the snap-fit engagement in which the locking nose 48 of the retainer plate 15 has snapped into the locking recess 36 of the end cap major body 8 to encase the lubricant applicator 25 and the retainer plate 15 together in the end cap major body 8 without them falling apart from each other. Only then is tightening the fastening bolt 13 done to fasten the end cap major body 8 encased as stated earlier to the carriage 3 together with the spacer 7 to finish the slider 2.

Figure 4:
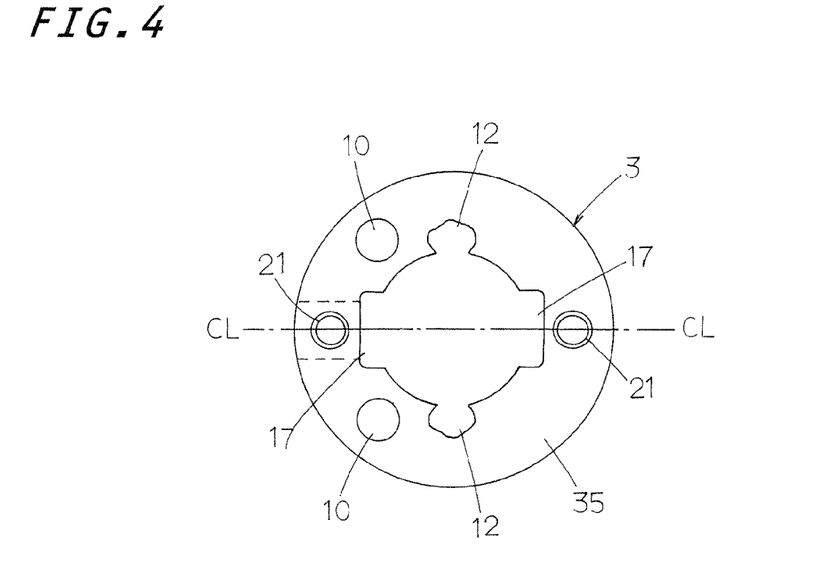
FIG. 4 is a view in front elevation, as seen in an axial direction, showing a carriage in the linear motion guide unit in FIG. 1.
Figure 5:
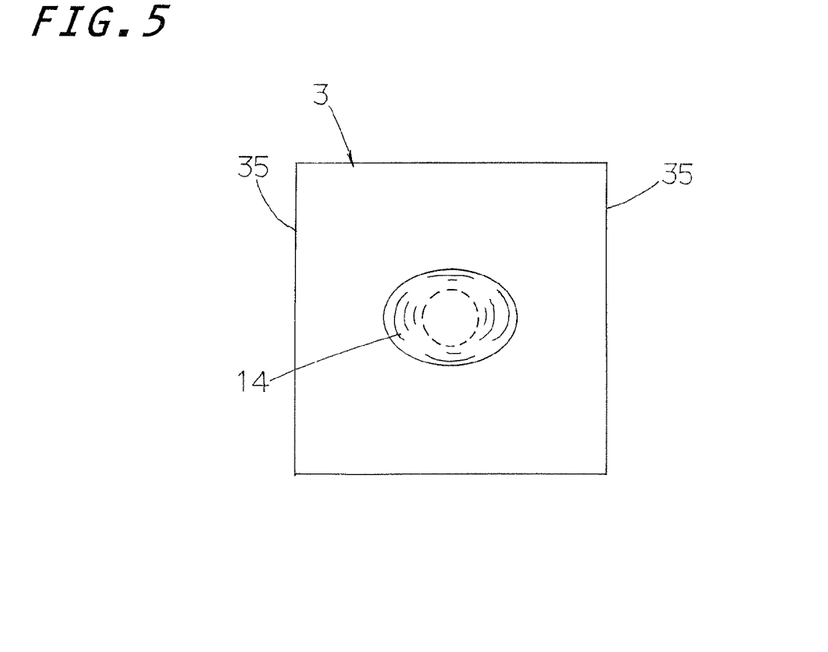
FIG. 5 is a view in side elevation of the carriage in FIG. 4.

The carriage 3, as shown in FIGS. 4 and 5, has a substantially cylindrical configuration in a transverse section view to allow the spline shaft or guide shaft 1 of a circular rod shape to extend through there. On an inside circular surface of the carriage 3, there are cut the raceway grooves 12 which extend lengthwise or axially in opposition to the raceway grooves 11 on the guide shaft 1. The raceway grooves 12 cut in the carriage 3 each have a pocket-like shape in a transverse section view, which is made somewhat larger in transverse dimension than a diameter of the ball 5 so as to permit the free rolling of the ball 5 while harboring or embracing the ball 5 therein. Especially, the raceway groove 12 having a pocket-like shape is open to the guide shaft 1 on the inside circular surface of the carriage 3 through a lengthwise slit which has an open width less than the diameter of the ball 5 to make it possible to keep the ball 5 inside the carriage 3 without falling away beyond the inside circular surface of the carriage 3. The raceway grooves 12 in the carriage 3 are cut at two locations spaced diametrically away from each other. Moreover, the carriage 3 has the return passages 10 which extend lengthwise in parallel with the raceway grooves 12 at locations spaced away from the raceway grooves 12 by preselected circular angles so as to allow the balls 5 circulating from the raceway grooves 12 to the return passages 10. The return passages 10 is constituted with lengthwise through-holes which are bored somewhat larger in diameter than the balls 5 at locations lying in bilateral symmetry with respect to a phantom line CL-CL lying midway between the raceway grooves 12 and 12 diametrically opposite to each other when viewed on the end surface 35 of the carriage 3. Such bilateral symmetrical arrangement of the return passages 10 on the end surface 35 of the carriage 3 makes it possible to use the same end caps 4 on either of the opposite ends surface of the carriage 3. On the inside circular surface of the carriage 3, moreover, there are made recesses 17 having a rectangular shape in a transverse section view extending lengthwise or axially at locations lying in diametrical opposition to each other on the phantom line CL-CL lying perpendicularly to the raceway grooves 12. The recesses 17 have rectangular gaps of twice or so the raceway groove 12 in width to make it easier to fit over every locating projection 40 of the end cap 4, which will be explained later with reference to FIG. 8. On the end surface 35 of the carriage 3, there are made the recesses 17 and internally threaded holes 21 to fit over the fastening bolts 13, the recesses 17 and the internally threaded holes 21 being formed on the phantom line CL-CL lying midway between the raceway grooves 12 and 12 diametrically opposite to each other. The carriage 3 has a locating conical concave 14 in one place around a circular periphery thereof to keep the carriage 3 against turning with respect to any housing, not shown, after the carriage 3 has been mounted to the housing. The locating conical concave 14 is prevailingly made in a key way or threaded hole.

Figure 6:
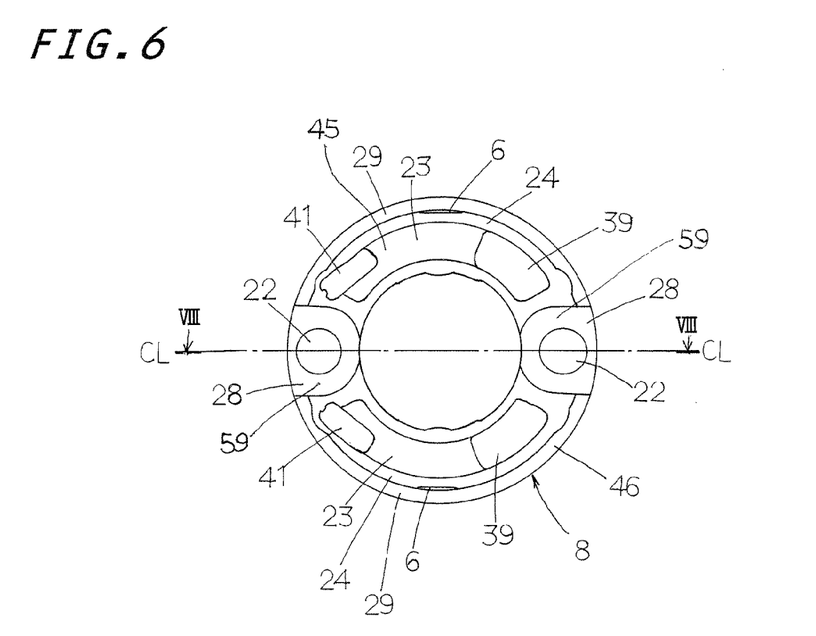
FIG. 6 is a view in front elevation of an end cap major body shown in FIG. 3.
Figure 7:
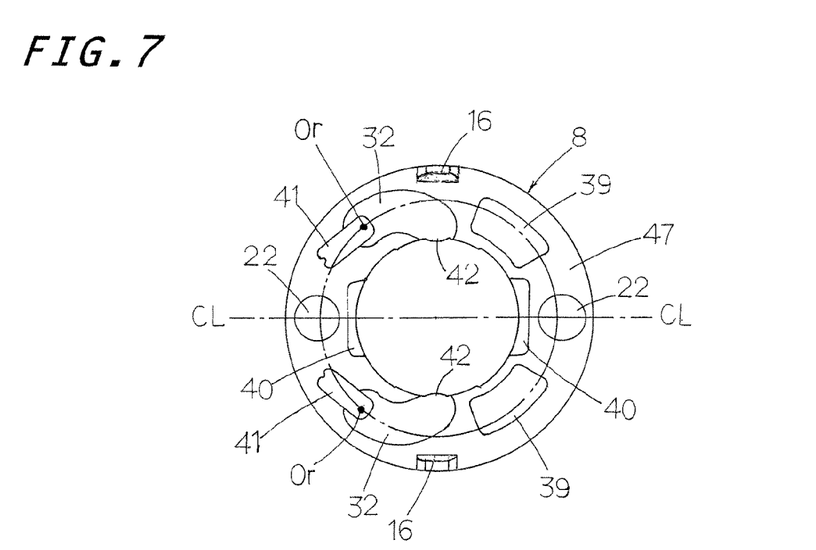
FIG. 7 is a view in rear elevation showing an end cap major body in FIG. 6.
Figures 8, 9:
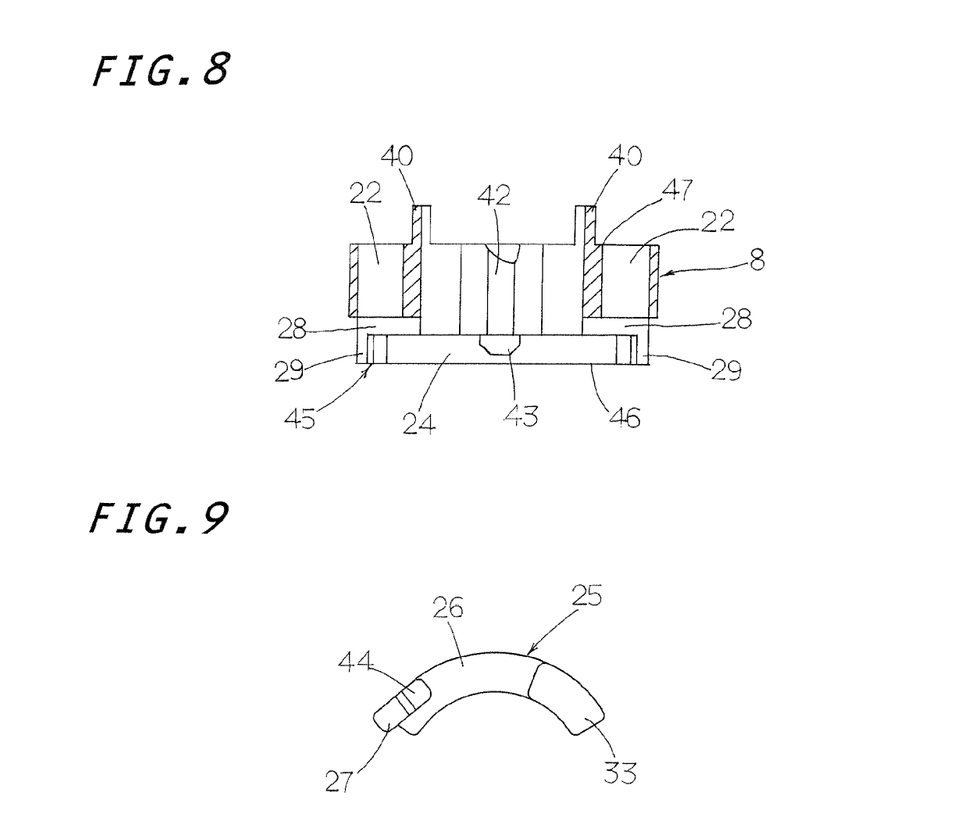
FIG. 8 is a view in longitudinal section of the end cap major body of FIG. 6, taken on the plane of the line VIII-VIII of FIG. 6.
FIG. 9 is a view in rear elevation of an upside one of lubricant applicators shown in FIG. 3.
Figure 10:
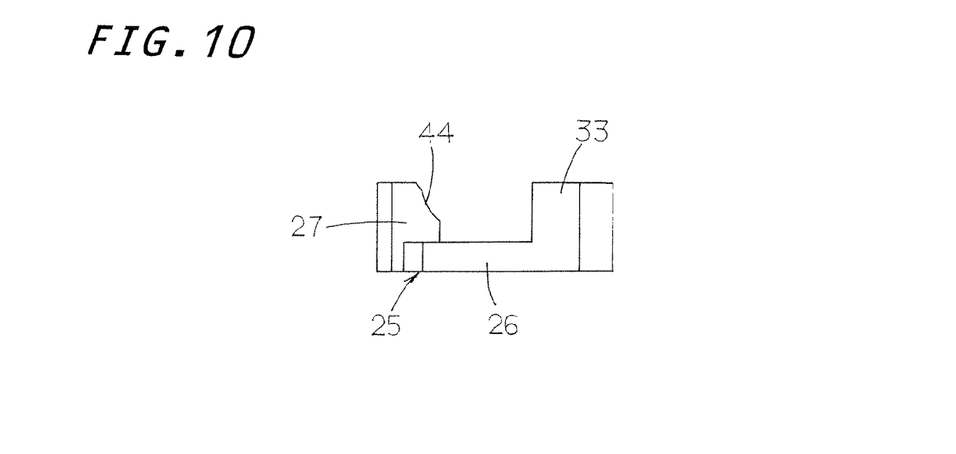
FIG. 10 is a view in bottom plan of the lubricant applicator shown in FIG. 9.
Figure 11:
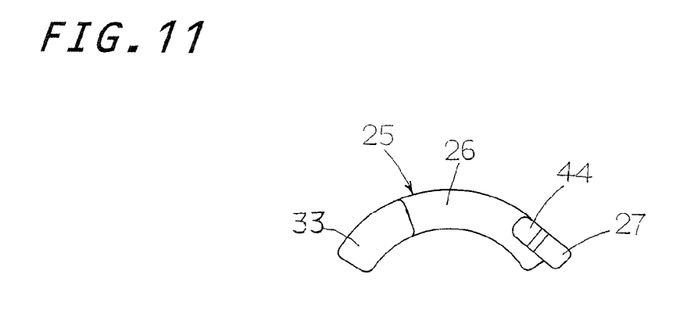
FIG. 11 is a view in rear elevation of a downside one of lubricant applicators shown in FIG. 3.
Figure 12:
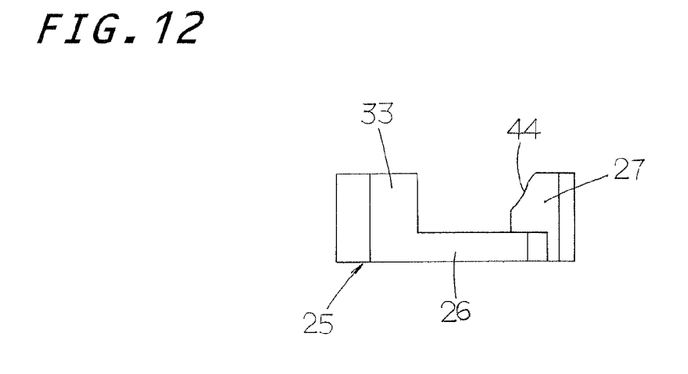
FIG. 12 is a view in bottom plan of the lubricant applicator shown in FIG. 10.

Referring to FIGS. 6 to 8, there is shown the end cap major body 8 of a hollow cylinder having inside circular surface and outside circular surface each of which is substantially the same as the inside circular surface or outside circular surface of the carriage 3. Various parts on the end cap major body 8 are made at locations lying in line symmetry with respect to a phantom midway line CL-CL lying likewise with the line CL-CL on the carriage 3. The end cap major body 8 on its backside 47 facing on the spacer 7, especially as shown in FIG. 7, has the curved outer halves 32 of the turnaround passages 30 to connect the return passages 10 in the carriage 3 to the load-carrying races 9 constituted with the raceway grooves 12 cut in the carriage 3. Load race-sided ends, or ends joining with the load-carrying races 9, of the turnaround passages 30 have scooping noses 42 extending somewhat radially inwards. The end cap major body 8 has the through-holes 22 lying on the midway line CL-CL in alignment with the threaded holes 21 in the carriage 3 to allow the bolts 13 stretching or extending through there. Locating projections 40 having a rectangular shape in a transverse section view are raised above the backside 47 of the end cap major body 8 in conformity with the rectangular recesses 17 in the carriage 3. After the locating projections 40 of the end cap major body 8 have fit past recesses 18 in the spacer 7 into the recesses 17 in the carriage 3, the end cap major body 8 is located with accuracy and set to the carriage 3. With the end cap major body 8, moreover, apertures 39 having a curved or sectorial rectangular shape are made between one of the through-holes 22 and either of the ends, joining with the load-carrying races 9, of the turnaround passages 30. Between the other of the through-holes 22 and either of the ends, joining with the return passage 10, of the turnaround passages 30, there are provided openings 41 each of which is designed to extend tangentially from the center Or of the associated return passage 10 to turn aside from the associated turnaround passage 30. The end cap major body 8 as shown in FIG. 6 is designed to sink below the front surface or outward end surface 45 thereof to provide the second recess 24 to fit over the retainer plate 15. The second recess 24 is surrounded with the circular edge 29. The second recess 24 reaches deeply to form the first recess 23 to receive therein the lubricant applicator 25. Thus, the second recess 24 is designed to have the shape of curved or sectorial rectangle extending inclusive of from the aperture 39 to the opening 41. The circular edge 29 is partially cut out at locations correspondent to the through-holes 22 to have the recesses 28 which are larger in depth than the second recesses 24. On the circular periphery of the end cap major body 8, slots serving as the locking recesses 16 are cut at locations perpendicular to the midway line CL-CL as shown in FIGS. 6 to 8. The locking recess 16 sinks somewhat below the inside circular surface of the circular edge 29 and extends from the backside 47 into the circular edge 29 to make a locking pit 43 in the circular edge 29. With the end cap major body 8 having the apertures 39 to accommodate the lubricant reservoir 33 of the lubricant applicator 25 shown in FIGS. 9 to 11, whether the lubricant applicator 25 is surely installed in the end cap major body 8 can be visible at a glance by only looking in at the apertures 39 from the backside 47 of the end cap major body 8.

Referring to FIGS. 9 to 12, there is shown the lubricant applicator 25 having a specific configuration adapted to fit into the first recess 23 in the end cap major body 8. The upside lubricant applicator 25 and downside lubricant applicator 25 are intended to fit into their respective upside and downside first recesses 23 which are formed in symmetry with respect to the midway line CL-CL as shown in FIG. 6. That is, a pair of the lubricant applicators 25 are placed in symmetry with respect to the midway line CL-CL. The lubricant applicator 25 is a porous or open-cell compact member formed of a sintered resinous member of a finely powdery ultrahigh molecular weight synthetic resin whose particles are partially fused together under pressure together with the application of heat to provide an open-porous texture in which the pores are open to each other through interstices among the fused particles to be filled with the lubricant. The lubricant applicator 25 prepared as stated earlier, despite being miniature or downsized, is superior in conformity or adaptivity in shape to the first recess 23 in the end cap major body 8, better in denseness and stiffness, and further advantageous in lubricant preservation. The lubricant applicator 25, moreover, is in favor of smooth application of lubricant at the applicator nose 27 which comes into touch with the balls 5. The lubricant applicator 25 is composed of the lubricant reservoir 33 having a block-like shape of a curved or sectorial rectangle in the transverse section view so as to fit snugly into the aperture 39 in the end cap major body 8, an applicator nose 27 having a rectangular shape in the transverse section view and extending into the opening 41 to fit into the opening 41, and a curved plate or a connector 26 to join integrally the lubricant reservoir 33 and the applicator nose 27. With the lubricant applicator 25 composed as stated earlier, the curved plate 26 has at one end thereof the lubricant reservoir 33 having a sectorial rectangular shape in the transverse section view spreading integrally at right angles out of the curved plate 26 and at another end thereof the applicator nose 27 having a flat rectangular shape in the transverse section view and integrally extending at right angles from the curved plate 26. After the lubricant applicator 25 has snugly fitted into the first recess 23 in the end cap major body 8, the applicator nose 27 fits into the opening 41 through the first recess 23 in the end cap major body 8 so as to expose a leading edge or tip thereof to the turnaround passage 30 in the end cap major body 8, thereby forming in part the curved outer half-surface 32 of the turnaround passage 30 to come into touch or contact with the balls 5 rolling through the turnaround passage 30. The leading edge has a curved edgewise surface 44 which closely matches to the spherical contour on the curved outer half-surface of the turnaround passage 30. The curved edgewise surface 44 is formed over substantially half range of the leading edge of the lubricant applicator 25 along the curved outer half-surface 32 of the turnaround passage 30 so as not to interfere with the rolling movement of the balls 5 through the turnaround passage 30. Thus, the balls 5 during rolling along the curved outer surface of the turnaround passage 30 are subjected to centrifugal force to maintain sure contact with the curved edgewise surface 44 of the lubricant applicator 25, thereby being surely applied with lubricant. With the lubricant applicator 25 constructed as stated earlier, the curved edgewise surface 44 of the applicator nose 27 experiences a slight elastic deformation every time the surface 44 comes into contact with the balls 5 recirculating through the looped circuit 6, thereby causing a pumping action, which conjoins with the capillarity in the porous compact to feed the applicator nose 27 with lubricant stored in the lubricant reservoir 33 opposite to the applicator nose 27 across the connector 26. The pumping action caused at the curved edgewise surface 44 of the applicator nose 27 as stated above works to soak up excessive lubricant adhering around the balls 5 to keep the amount of lubricant fed around the balls 5 moderate.

Figure 13:
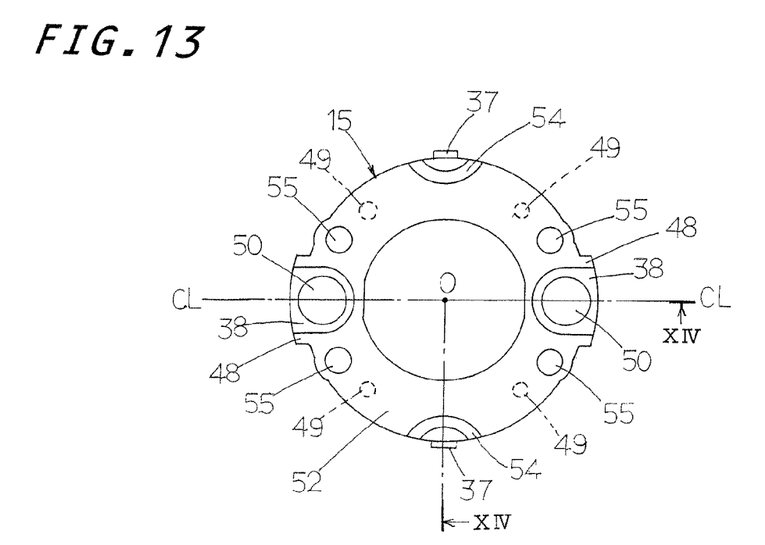
FIG. 13 is a view in front elevation of a plate shown in FIG. 3.
Figure 14:
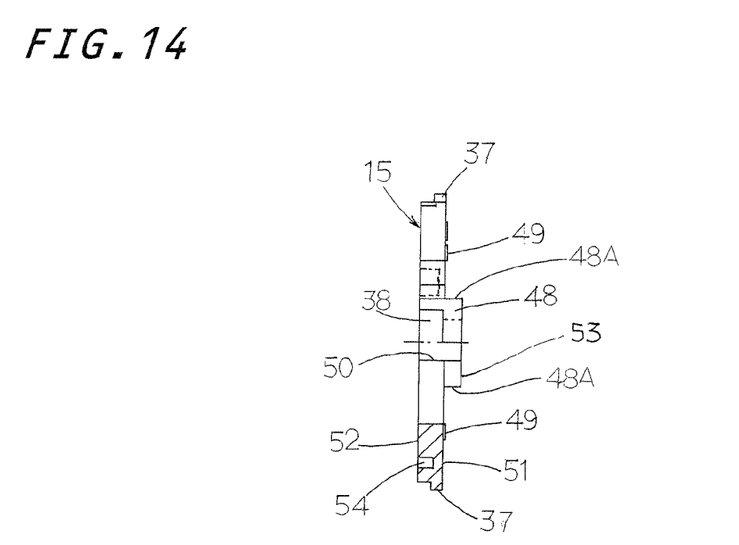
FIG. 14 is a view in transverse section of the retainer plate of FIG. 13, taken on the plane of the line XIX-O-XIX of FIG. 13.
Figure 15:
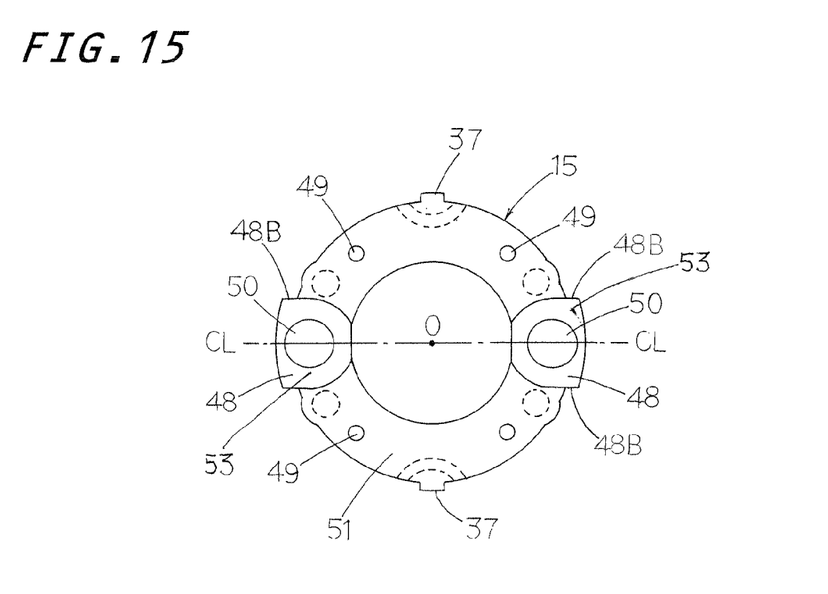
FIG. 15 is a view in rear elevation of the retainer plate shown in FIG. 3.
Figure 16:
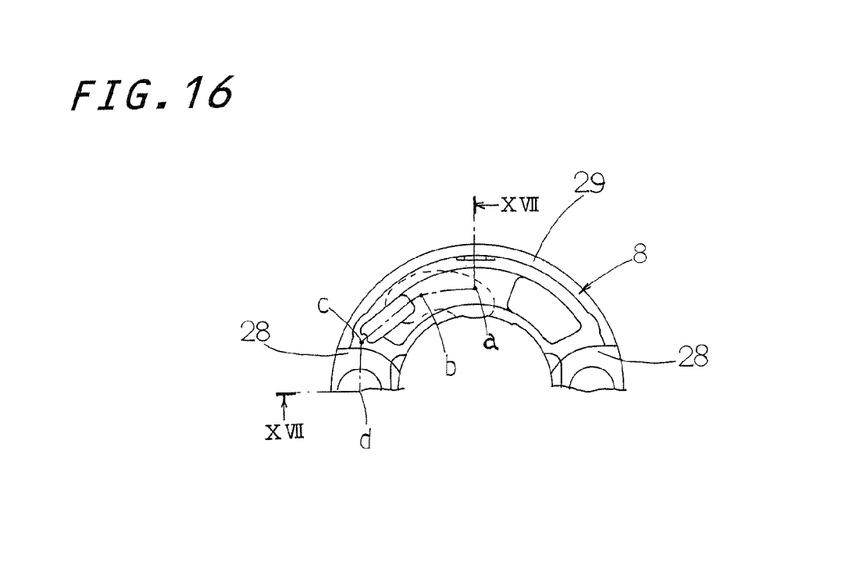
FIG. 16 is a view explaining locations on a section of the plane taken along the line XVII-a-b-c-d-XVII with reference to a half portion of the end cap major body in FIG. 6.
Figure 17:
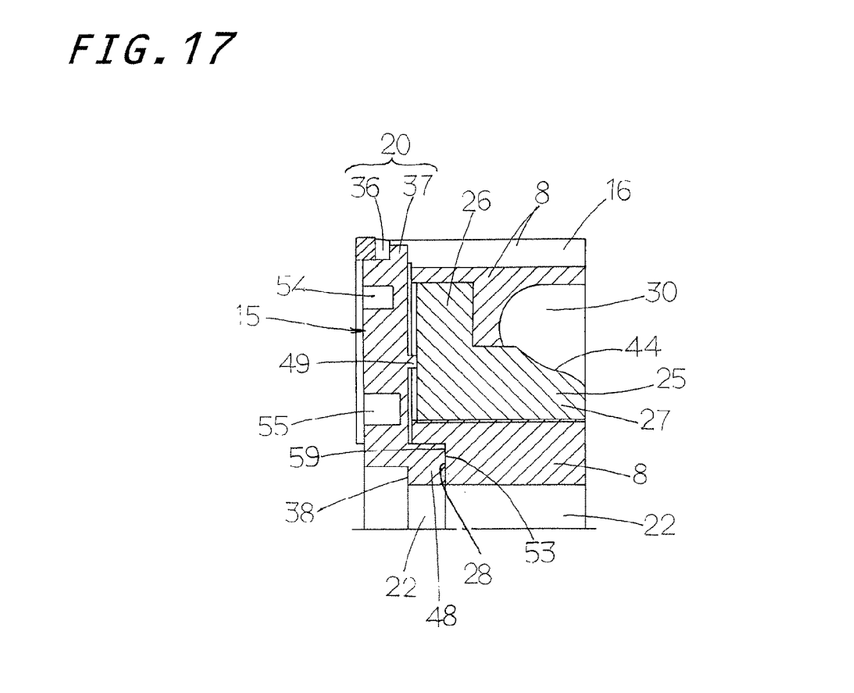
FIG. 17 is a fragmentary view in section showing an assembled relation between the lubricant applicator and the retainer plate united or built in the end cap major body, taken on the plane of the line XVII-a-b-c-d-XVII of FIG. 16.

Referring to FIGS. 13 to 15, there is shown the retainer plate 15 of an annular disc made smaller in thickness to fit into the second recess 24 in the end cap major body 8. The retainer plate 15 has various parts arranged around the peripheral area thereof in line symmetry with respect to a midway line CL-CL imagined to match closely with the midway line CL-CL on the end cap major body 8. The retainer plate 15 especially as shown in FIG. 13 has on the peripheral edge thereof a pair of the locking nose 37 lying offset or biased axially of the annular disc toward the backside 51 at locations diametrically opposite in perpendicular to the midway line CL-CL. A front surface 52 of the retainer plate 15 is partially grooved at 54 adjacent to the locking nose 37 to surround the locking nose 37, making the locking nose 37 deformable resiliently to get easily under the circular edge 29, thereby snapping into the locking pit 43 of the end cap major body 8. Moreover, the retainer plate 15 has the lugs 48 lying raised above the backside 51 at locations diametrically opposite on the midway line CL-CL. The lugs 48 each have the hole 50 through which the bolt 13 is allowed to extend across the axial distance of the retainer plate 15, and the counter sink 38 to conceal wholly the head of the bolt 13. The lugs 48 are to guide and locate the retainer plate 15 with accuracy relative to the end cap major body 8 prior to alignment of the locking nose 37 with the locking pit 43 in the end cap major body 8. To this end, the lugs 48 of the retainer plate 15 are brought into fit into the recesses 28 in the end cap major body 8. Thereafter, the fastening bolts 13 extend past the end cap major body 8 to fit into the threaded holes in the carriage 3, when tightened, the mating surfaces 53 in the recesses 28 in the end cap major body 8 and the mating surfaces 59 on the lugs 48 of the retainer plate 15 are squeezed together or closely pressed against each other to keep in place the lubricant applicator 25 and the retainer plate 15 with respect to the end cap major body 8. Presser pawls 49 to press the lubricant applicator 25 against the end cap major body 8 are raised above the backside 51 of the retainer plate 15 at four spots spaced circumferentially at regular intervals. The presser pawls 49 are especially envisaged putting the applicator noses 27 of the lubricant applicator 25 in the middle of the respective return passages 10. Further, the presser pawls 49 are arranged at four locations in circumferentially symmetry around the center O and, therefore, even if the retainer plate 15 is applied to the end cap 4 turned upside down over 180°, the presser pawls 49 can function without causing difficulty. The presser pawls 49 out of the applicator nose 27 of the lubricant applicator 25 make engagement with the lubricant reservoir 33 of the lubricant applicator 25. On the front surface of the retainer plate 15, there are provided four holes 55 at spots spaced circumferentially at regular intervals. These holes 55 are used to mount a separate end seal, not shown, to the end cap 4. The retainer plate 15 is preferably made of synthetic resins. Alternatively, the retainer plate 15 is made integral with the end seal.

Figure 18:
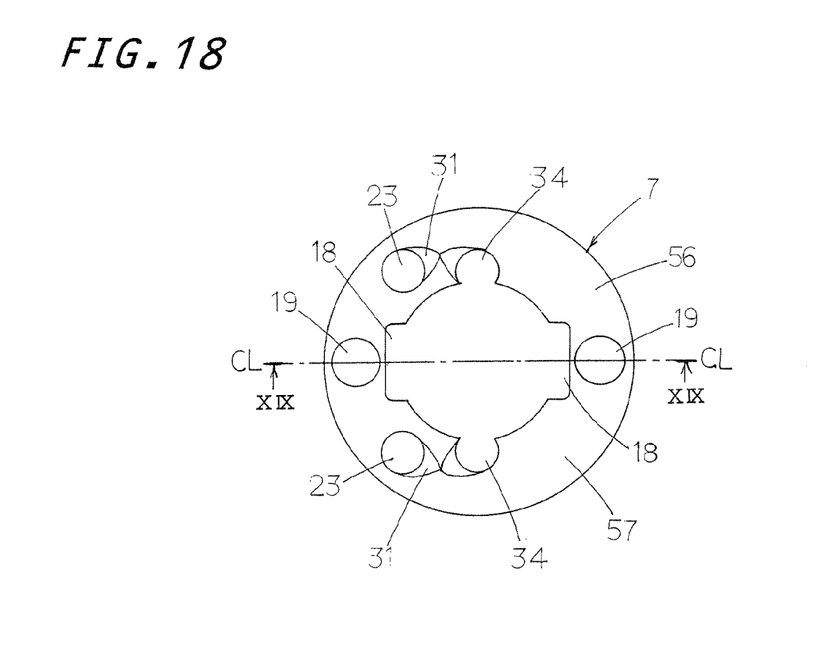
FIG. 18 is a view in front elevation showing a spacer in FIG. 3.
Figure 19:
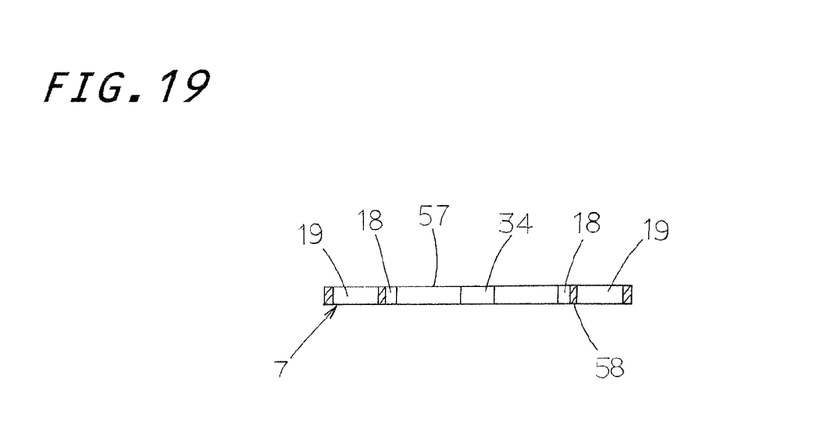
FIG. 19 is a view in transverse section of the spacer, taken on the plane of the line XIX-XIX of FIG. 18.

Finally referring to FIGS. 18 and 19, there is shown a spacer 7 formed of an annular thin plate or disc having inside and outside circular edges substantially matching with the inside and outside circular edges of the end cap major body 8, respectively. Various parts on the spacer 7 are arranged at locations lying in line symmetry with respect to a phantom midway line CL-CL lying likewise with the line CL-CL on the end cap major body 8. The spacer 7 on its front surface facing on the end cap major body 8 has the curved inner halves 31 of the turnaround passages 30 lying in opposition to the curved outer halves 32 on the end cap major body 8. The spacer 7 on the midway line CL-CL has through-holes 19 lying in alignment with the through-holes 22 in the end cap major body 8, and rectangular recesses 18 made to fit over the locating projections 40 of the end cap major body 8. The spacer 7 is located with accuracy in place and secured to the carriage 3 after the locating projections 40 of the end cap major body 8 have fit past the recesses 18 in the spacer 7 into the recesses 17 in the carriage 3. The spacer 7 is secured on the backside 58 thereof to the end surface 35 of the carriage 3 to constitute the end cap 4 in combination with the end cap major body 8. As an alternative, it is also possible to nest a component having only the curved inner half-surface 31 of the turnaround passage 30 into the end cap major body 8, in which case the component having only the curved inner halves 31 of the turnaround passages 30 will get too small to make it harder to combine it with the end cap major body 8. In contrast, the spacer 7 of annular thin plate or disc as stated earlier is advantageously easy to use or handle it.

What is claimed is:
1. A miniature linear motion guide unit with lubrication system comprising an elongated guide shaft having first raceway grooves extending lengthwise of the guide shaft at locations circumferentially spaced apart from each other and a slider fitting over or conforming to the guide shaft to move along the guide shaft in a sliding manner through rolling elements,
  wherein the slider is composed of a carriage having second raceway grooves lying in opposition to the first raceway grooves on the guide shaft to define load-carrying races between the first raceway grooves on the guide shaft and the second raceway grooves on the carriage and further having return passages extending in parallel with the load-carrying races, end caps attached to lengthwise opposite ends of the carriage, the end caps having turnaround passages to connect the load-carrying races with the return passages, and the rolling elements recirculating through looped circuits made up of the load-carrying races, return passages and the turnaround passages, wherein the end caps each have therein a porous compact lubricant applicator impregnated with lubricant to apply the lubricant to the rolling elements while rolling through the turnaround passages and a retainer plate to squeeze the lubricant applicator to seal and secure the lubricant applicator at a preselected location, wherein the retainer plate is kept in the end cap by a snap-fit engagement with the end cap, wherein the end caps each have a first recess and a second recess, the first recess lying in an outward end surface of the end cap to receive the lubricant applicator, the second recess that simply receives the retainer plate, and a circular edge surrounding both the lubricant applicator received in the first recess and the retainer plate received inside the second recess, wherein the end cap is made of elastic synthetic resins and has a locking recess on the circular edge of the end cap and the retainer plate is made of elastic synthetic resins and has a locking nose on a circumferential edge around the retainer plate in opposition to the locking recess and further wherein the locking nose experiences elastic deformation to snap into the locking recess to make the snap-fit engagement between the retainer plate and the circular edge of the end cap, wherein the retainer plate on a front surface thereof is depressed to provide a countersink to receive a head of a fastening bolt to tighten the retainer plate against the carriage and correspondingly raised above a backside thereof to provide a lug, wherein the circular edge on the end cap has a third recess at a location conforming to the lug of the retainer plate to receive the lug of the retainer plate, wherein the retainer plate is set in place with respect to the end cap while the lug of the retainer plate fits into the third recess on the end cap and the retainer plate is locked or held in the end cap with the snap-fit engagement after the lug of the retainer plate has snugly fit into the third recess on the end cap, and wherein the fastening bolt extends past the end cap from the counter sink to fit into the carriage, when tightened, the third recess in the end cap and the lug of the retainer plate are squeezed together or closely pressed against each other to keep in place the lubricant applicator and the retainer plate with respect to the end cap.

2. A miniature linear motion guide unit with lubrication system as set forth in claim 1, wherein the guide shaft is a round rod circular in a transverse section view and not more than 6 mm in diameter and the slider is a cylindrical shell which fits over or conform to the guide shaft, and the guide shaft and the slider are combined to form a ball spline to transmit torque between the guide shaft and the slider through the rolling elements.

3. A miniature linear motion guide unit with lubrication system as set forth in claim 1, wherein the retainer plate on the backside thereof has presser pawls to squeeze the lubricant applicator.

4. A miniature linear motion guide unit with lubrication system as set forth in claim 1, wherein the carriage when viewed on the end surface thereof has the raceway grooves at two locations spaced diametrically opposite to each other, and the return passages lying in bilateral symmetry with respect to a line lying midway between the raceway grooves, thereby making it possible to use the same end caps on either of the opposite ends surface of the carriage to complete the slider.

5. A miniature linear motion guide unit with lubrication system as set forth in claim 1, wherein the end cap is composed of a spacer and an end cap major body, the spacer at a backside thereof coming into abutment against any one of lengthwise opposite end surfaces of the carriage and at a front surface thereof coming into abutment against the end cap major body, the front surface having curved inner halves of the turnaround passages, and the end cap major body at a backside thereof coming into abutment against the front surface of the spacer, the backside being provided thereon with curved outer halves of the turnaround passages, which mate with the curved inner halves on the spacer to complete the turnaround passages, and wherein the end cap major body has an aperture to accommodate therein a lubricant reservoir of the lubricant applicator and an opening comprising a through-hole to fit over an applicator nose of the lubricant applicator.

6. A miniature linear motion guide unit with lubrication system as set forth in claim 5, wherein the lubricant applicator is composed of a porous or open-cell compact of a sintered resinous member of finely powdery synthetic resin whose particles are partially fused together under pressure together with application of heat to provide an open-cellular texture in which cells are open to each other through interstices among fused particles and filled with lubricant, wherein the lubricant applicator is composed of the lubricant reservoir that fits snugly into the aperture provided in the end cap major body at a location near a load race-sided end of the turnaround passage, the applicator nose having a rectangular shape in a transverse section view and extending into the opening drilled through a curved surface of the turnaround passage at a location near a return passage-sided end of the turnaround passage to expose a leading edge thereof to the turnaround passage to apply the lubricant around the rolling elements, the leading edge of the applicator nose further having a curved edgewise surface which closely matches to the curved surface of the turnaround passage, and a connector comprising a curved plate joining integrally the lubricant reservoir and the applicator nose.

7. A miniature linear motion guide unit with lubrication system as set forth in claim 5, wherein the end cap major body has a locating projection of flat and rectangular in a transverse section view lying along an inside circular surface in the end cap major body, the locating projection being raised above the backside of the end cap major body to extend past a recess in the spacer into a recess lying along an inside circular surface in the carriage, thereby locating and setting the end cap major body with accuracy to the carriage.

* * * * *